W. MacGLASHAN.
SPRING SEAT AND AXLE BEARING.
APPLICATION FILED MAY 7, 1915.
1,234,552.
Patented July 24, 1917.
2 SHEETS—SHEET 2.
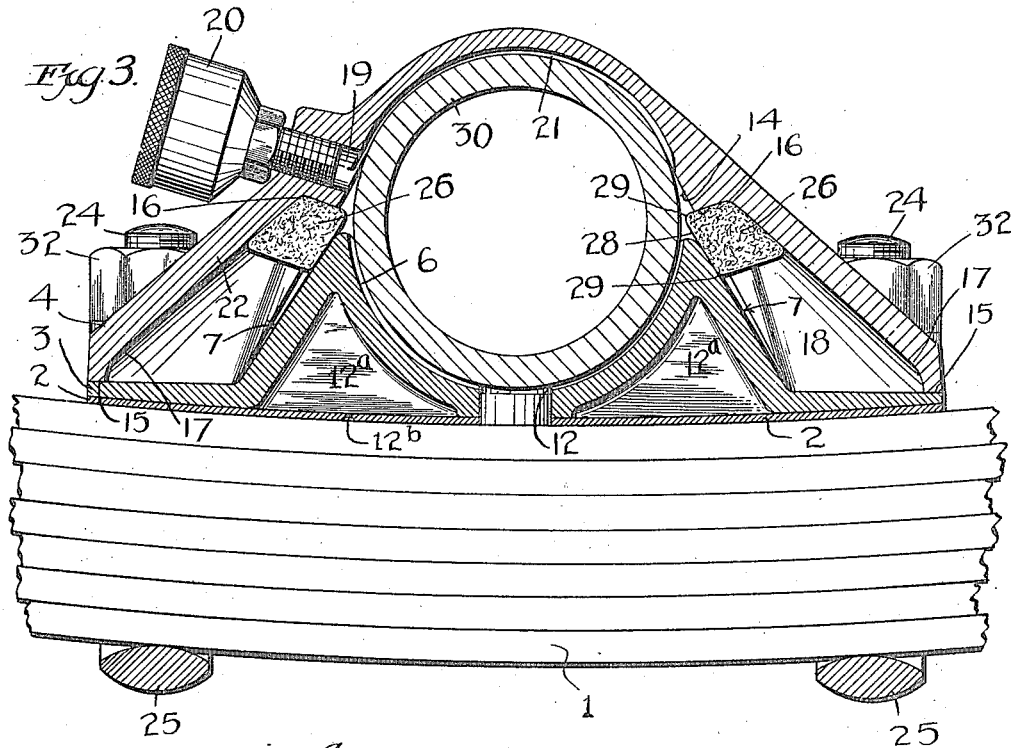
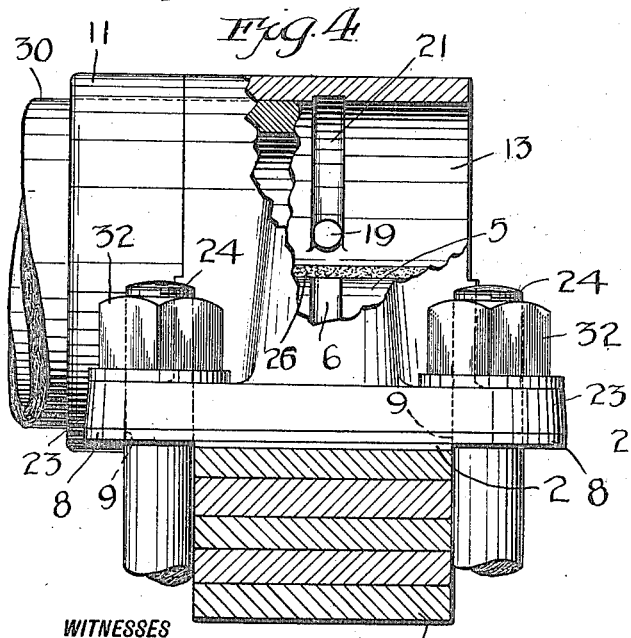
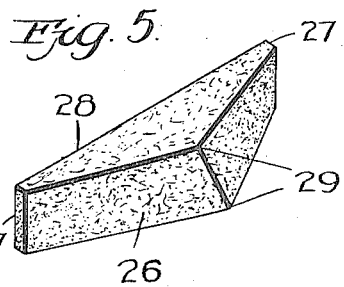
WITNESSES
INVENTOR
Wm McGlashan
BY
Stewart & Perry
his ATTORNEYS

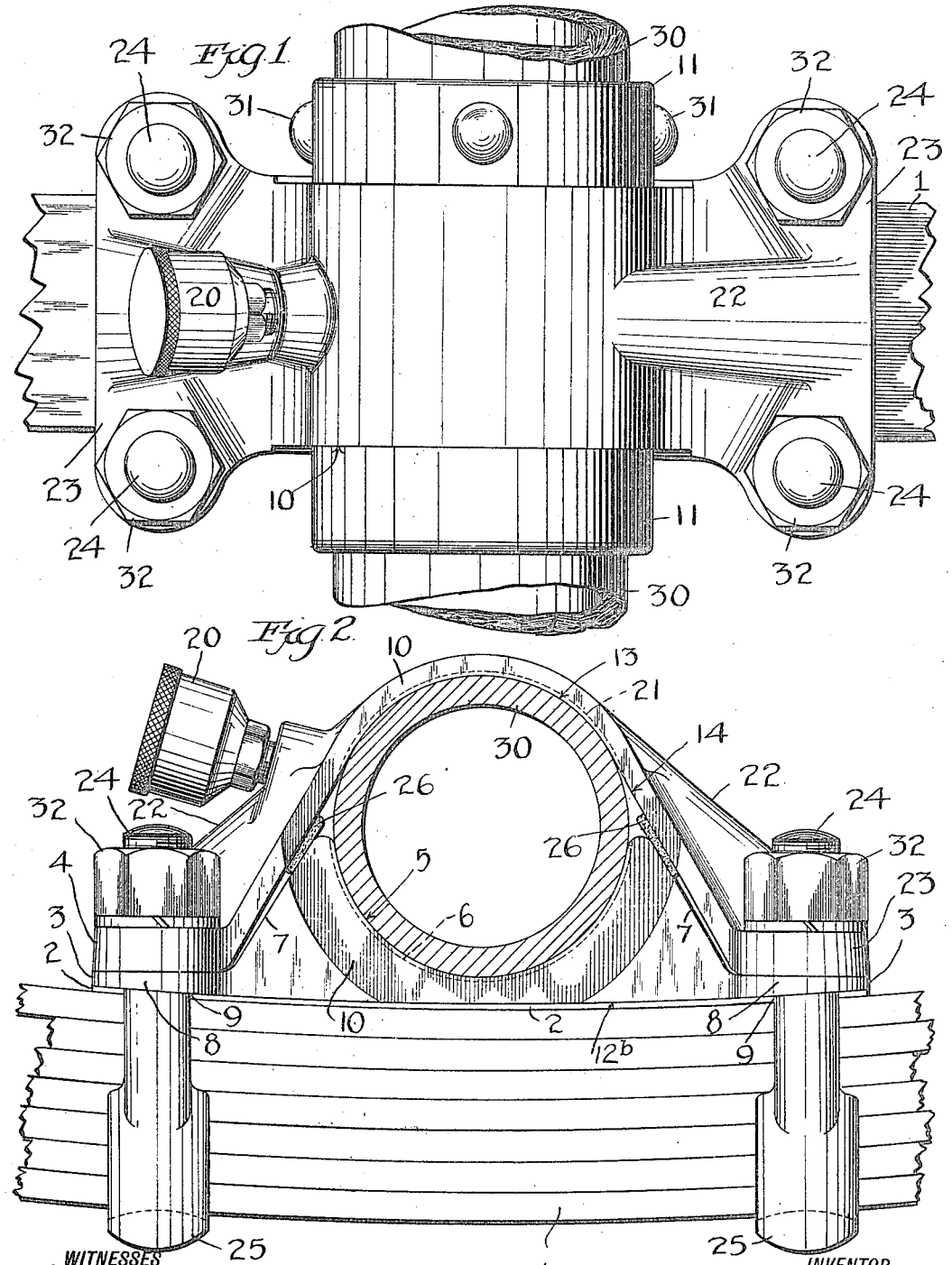

UNITED STATES PATENT OFFICE.

WILLIAM MacGLASHAN, OF DETROIT, MICHIGAN, ASSIGNOR TO THE STUDEBAKER CORPORATION, A CORPORATION OF NEW JERSEY.

SPRING-SEAT AND AXLE-BEARING.

1,234,552.  Specification of Letters Patent.  Patented July 24, 1917.

Application filed May 7, 1915. Serial No. 26,468.

*To all whom it may concern:*

Be it known that I, WILLIAM MacGLASHAN, a citizen of the United States of America, and resident of the city of Detroit, county of Wayne, and State of Michigan, have invented certain new and useful Improvements in Spring-Seats and Axle-Bearings, of which the following is a specification.

My invention relates to an improvement in means for securing axle bearings to laminated springs as the same are used in vehicle construction.

The object of my invention is to provide a device having two parts which will serve the purpose of both a spring seat and an axle bearing and which is capable of being constructed by the well known drop forge processes or otherwise, thus securing economy of construction and providing a device that is strong and durable and one which may be readily applied and replaced in the event of wear.

I have illustrated my invention in the accompanying drawings designating the parts by numerals, referring to like parts by like numerals.

Figure 1 is a plan view of the device as applied to a spring. Fig. 2 is a view in the line of the longitudinal axis of the bearing with one of the end rings 11 removed. Fig. 3 is a vertical section of Fig. 1 taken on a line perpendicular to the longitudinal axis of the bearing, adjacent the center thereof. Fig. 4 is an elevation partly in section taken on a line perpendicular to the longitudinal axis of the bearing. Fig. 5 is a perspective view of a felt washer employed as a cushioning means interposed between the two halves of the device.

1 represents a plurality of the leaves of a laminated spring. 2 is a plate overlying the spring and interposed between the bearing device and the spring. 3 is one of two halves which when combined constitute the axle bearing and spring seat. 4 is the other half, more specifically defined later. Concerning the half or part numbered 3, the details thereof are as follows:—5 is a semi-cylindrical bearing surface, 6 an annular groove in said surface. 7—7 are faces and 8—8 are flanges. The portion of the part 3 embodying the converging faces 7 7 and annular groove 6 forms an upstanding projection extending upwardly beyond the remainder of said part 3, as clearly shown in Figs. 2 and 3. Through the flanges 8—8 are the bolt holes 9. On the opposite ends of the bearing support are the surfaces 10 to receive the rings 11. 11—11 are rings which are run on to the shaft 30 and secured thereto by the bolts 31. 12 is a hole for the head of a bolt in the member 3. 12$^a$ is a space in the member 3 made for the purpose of lightening the construction. 12$^b$ is the undersurface of the member 3 which operates as a seat for the member when in contact with the laminated spring 1. As to the part 4, the details of this may be described as follows:—13 is a semi-cylindrical bearing surface forming with the semi-cylindrical bearing surface of part 3 numbered 5, a complete bearing for the shaft 30. This member has the surfaces 14 and 15 and is internally cored to form the chamber lying between the points 16 and 17, thus forming the hollow space 18, while the converging surfaces 14 and the semi-cylindrical bearing surface 13 collectively form the major portion of the under side of the part 4 into a reëntrant portion, into which the projecting portion of the part 3 is adapted to extend, when parts 3 and 4 are in assembled relation. 19, Fig. 4, shows a port for the supply of lubricant while 20 is a grease-cup connected therewith. 21 is an annular groove in the member 4 corresponding to the annular groove 6 in the part 3. In Fig. 3, these annular grooves 6 and 21 are shown in that sectional view, the section being taken through the groove. 22, Fig. 1, shows the elevation producing the hollow chamber 18 shown in Fig. 3. 23 are flanges emanating from the parts 3 and 4 substantially in planes parallel to each other. These, as stated, are pierced with holes. 25—25 are yokes intended to embrace the laminated springs, the same being U-shaped in form, the arms of the U forming the bolts 24. These bolts pass through the holes in the flanges of the parts 3 and 4 which overlie, the holes in each registering so that the bolts pass through the same. Said bolts are provided with the nuts 32 by means of which the spring and the parts 3 and 4 are securely bound together.

26—26 are washers interposed between the parts or halves 3 and 4. I have illustrated the form of these washers in perspective in Fig. 5. I prefer that they be made of felt but any other elastic substance may be used for the purpose. The edges 27 of these washers are thin presenting a smooth surface at 28 and being of angular construction as indicated at 29, the form being adapted to permit the same to fit into the hollow recess 18 as shown in Fig. 3, where also will be seen a cross section of the pad 26, the same being quadrilateral in cross section. These washers serve the purpose of confining the lubricant employed within the bearing at the sides thereof, while the rings 10 and 11 serve to confine it within the bearing at the ends thereof.

It will thus be seen that I have constructed a spring seat and axle bearing formed of two parts which are secured to the laminated spring and also secured together by the yoke 25, bolts 24 and nuts 32, together with lubricating means for the same.

It will be understood that when the two rings 11—11 are run on to the shaft and they contact with the halves 3 and 4 at the surfaces 10, the lubricant employed will be confined within the bearing.

It clearly appears from the foregoing detailed description that the part or member 3, with its upwardly converging sides and parallel ends, constitutes a base block of generally triangular, prismatic contour having the concave bearing surface 5 formed within its apex. That is to say, it is substantially prismatic in shape and has, generally, a triangular cross-section, as clearly appears from the drawings. The other part 4, which extends over the axle and embodies the other portion 13 of the bearing surface, forms, in effect, a retaining strap which, when the bearing is in use, constitutes a tension member. It is found in practice that, since the work done by said strap is through forces acting longitudinally thereof, bending strains or stresses on the strap are avoided and the same is not open to the defects so common in the prior art where the retaining member is subjected to bending strains, only.

What I claim is:—

1. A spring seat and axle bearing embodying a pair of coöperating blocks, one face of each of which is shaped to conform to a portion of an axle, one of said faces being shaped with a reëntrant portion and the complementary face having a projecting portion adapted to seat in the reëntrant portion, and means for securing said blocks together, with the coöperating reëntrant and projecting portions in interfitting engagement, and simultaneously positioning said blocks collectively upon a spring, in combination with pads positioned between the complementary reëntrant and projecting portions, whereby the securing of said blocks together wedges the pads firmly in place to preclude leakage of the lubricant in the bearing.

2. A device of the class described embodying a base block having converging faces, between which is formed a concave portion adapted to partially embrace a vehicle axle, a substantially V-shaped retaining strap fitted over the axle with that portion of the strap which engages with the axle curved to conform to the contour of said axle, and means for binding the free ends of the strap to the base block for the purpose of securing the parts of the bearing about the axle.

3. A spring seat and axle bearing embodying a pair of coöperating blocks, one face of each of which is shaped to conform to a portion of an axle, one of said faces being shaped with a reëntrant portion and the complementary face having a projecting portion adapted to seat in the reëntrant portion, and means for securing said blocks together, with the coöperating reëntrant and projecting portions in interfitting engagement, and simultaneously positioning said blocks collectively upon a spring, in combination with pads positioned between the complementary reëntrant and projecting portions, whereby the securing of said blocks together wedges the pads firmly in place to preclude leakage of the lubricant in the bearing, and packing rings positioned at the opposite faces of the bearing for precluding leakage longitudinally of the axle.

4. In a device of the class described, a base block having a substantially triangular, prismatic contour, provided at its base with laterally extending attaching flanges, and the apex of said prism being cut away to form a substantially semi-cylindrical concave bearing face forming a seat for an axle, in combination with a substantially inverted V-shaped retaining strap fitted over the axle and having that portion of the strap which engages with said axle curved to conform to the contour of the axle, and means for binding the free ends of the strap to the flanges of the base block.

5. A device of the class described embodying a base block provided at its opposite sides with attaching flanges, the opposite side faces of said base block extending upwardly from said flanges and converging toward one another, and a substantially semi-cylindrical depression between said faces to provide a seat for an axle, in combination with a substantially inverted V-shaped retaining strap passed over the axle, and provided at its ends with flanges coöperating with the attaching flanges of the base block, and means for binding the flanges of the base block and the retaining strap together, that portion of the retaining strap which passes over the axle being shaped to conform to the contour of said axle, whereby the forces exerted upon the strap in binding the axle within the seat of the base block are transmitted through said strap as tension, and torsional or bending strains are obviated.

6. In a device of the class described, an upwardly tapering substantially wedge-shaped base block provided at its base with laterally extending attaching flanges and in its apex with a depressed, substantially semi-cylindrical axle bearing surface, in combination with an axle retaining strap, of substantially inverted V-shaped contour, provided at its ends with flanges coöperating with the attaching flanges of the base block, the portion of the inner contour of said strap which passes over the axle being shaped to conform therewith, and the inner portions of said strap which are juxtaposed with the wedge-shaped portion of the base being complementarily formed with respect to the wedge-shaped portion of the base.

7. In a device of the class described, a base block embodying a wedge-shaped body portion provided at its base with laterally extending attaching flanges and in its apex with a substantially semi-cylindrical depression adapted to form a seat for an axle, in combination with a retaining member having a complementary, wedge-shaped reëntrant portion, the apex of which wedge-shaped reëntrant portion is curved to conform to the contour of the axle, and means for binding the base and retaining members together to embrace the axle.

8. In a device of the class described, a base block embodying a wedge-shaped body portion provided at its base with laterally extending attaching flanges and in its apex with a substantially semi-cylindrical depression adapted to form a seat for an axle, in combination with a substantially inverted V-shaped retaining strap passed over the axle and provided at its ends with attaching flanges, and means for binding the attaching flanges of the base block and retaining strap together, that portion of the retaining strap which passes over the axle being shaped to conform to that portion of the contour of the axle with which it coöperates, whereby the forces exerted upon the strap in binding the axle within the seat of the base block are transmitted through said strap as tension, and torsional or bending strains are obviated.

9. In a device of the class described, a base block embodying a wedge-shaped body portion provided at its base with laterally extending attaching flanges and in its apex with a substantially semi-cylindrical depression adapted to form a seat for an axle, in combination with a retaining strap passed over the axle and provided at its opposite ends with flanges for attaching the strap to the flanges of the base block, whereby the forces exerted upon the strap in binding the axle within the seat of the base block are due entirely to tension, and torsional or bending strains are obviated.

10. A device of the class described, embodying a base block provided with a bearing surface having flanges at its base and the sides of said base block being tangential to the bearing and extending from the bearing to the attaching flanges, in combination with a retaining strap having a coöperating bearing surface and provided at its ends with attaching flanges, and means for securing the flanges of the retaining strap to the flanges of the base block, the arms of said retaining strap extending in substantially tangential directions from said bearing surface and in parallel relation to the tangential surface of the base block.

11. A device of the class described embodying a base block provided with a bearing surface having flanges at its base and the sides of said base block being tangential to the bearing and extending from the bearing to the attaching flanges, in combination with a retaining strap having a coöperating bearing surface, said strap being provided with arms substantially tangential to the bearing surface and secured at their ends to the base block, and provided at its ends with attaching flanges, and means for securing the flanges of the retaining strap to the flanges of the base block, the arms of said retaining strap extending in substantially tangential directions from said bearing surface and in parallel relation to the tangential surface of the base block.

12. In a device of the class described, a base block provided with a bearing surface, in combination with a strap having a coöperating bearing surface in the form of a section of a cylinder, said strap being provided with inclined arms forming shaft supporting tension members, and means at the ends of the arms for securing the strap to the base block.

Signed by me at Detroit, Michigan, this 4th day of May, 1915.

WM. MacGLASHAN.

Witnesses:
R. E. SCRATCH,
T. M. MAYO.